United States Patent
Kerstan et al.

(10) Patent No.: US 8,269,614 B2
(45) Date of Patent: Sep. 18, 2012

(54) VIBRATORY ASSEMBLY FOR A VEHICLE

(75) Inventors: Stefan Kerstan, Groβ-Zimmern (DE); Marcus Kandler, Flörssbachtal (DE)

(73) Assignee: Takata AG, Aschaffenburg (DE)

( * ) Notice: Subject to any disclaimer, the term of this patent is extended or adjusted under 35 U.S.C. 154(b) by 503 days.

(21) Appl. No.: 12/588,443

(22) Filed: Oct. 15, 2009

(65) Prior Publication Data

US 2010/0039245 A1    Feb. 18, 2010

Related U.S. Application Data

(63) Continuation of application No. PCT/EP2008/056152, filed on May 20, 2008.

(30) Foreign Application Priority Data

May 23, 2007   (DE) .......................... 10 2007 024 140

(51) Int. Cl.
- *H04B 3/36* (2006.01)
- *G08B 23/00* (2006.01)
- *G08B 5/30* (2006.01)

(52) U.S. Cl. ...................... 340/407.1; 340/965; 340/7.6

(58) Field of Classification Search .................. 340/965, 340/7.6, 407.1
See application file for complete search history.

(56) References Cited

U.S. PATENT DOCUMENTS

| | | | | |
|---|---|---|---|---|
| 7,561,142 | B2* | 7/2009 | Shahoian et al. | 345/156 |
| 2001/0054326 | A1* | 12/2001 | Onodera et al. | 74/552 |
| 2004/0090321 | A1 | 5/2004 | Keutz | |
| 2005/0030166 | A1 | 2/2005 | Kraus et al. | |
| 2005/0120496 | A1* | 6/2005 | Miller et al. | 15/22.1 |
| 2006/0097857 | A1 | 5/2006 | Osaka et al. | |
| 2006/0157632 | A1* | 7/2006 | Delson | 248/550 |

FOREIGN PATENT DOCUMENTS

| | | |
|---|---|---|
| DE | 100 26 048 C2 | 12/2001 |
| DE | 102 11 946 C1 | 7/2003 |
| DE | 102 09 206 A1 | 9/2003 |
| DE | 20 2004 001 832 U1 | 5/2004 |
| EP | 08 856 432 A | 8/1998 |
| EP | 0 958 965 A | 11/1999 |
| EP | 1 410 972 A | 4/2004 |
| WO | WO 02/057116 A1 | 7/2002 |

* cited by examiner

*Primary Examiner* — Jennifer Mehmood
*Assistant Examiner* — Andrew Bee
(74) *Attorney, Agent, or Firm* — Foley & Lardner LLP

(57) ABSTRACT

A vibrator assembly for a vehicle for generating an oscillation of a vehicle part detectable by a person is provided. The vibrator assembly comprising a vehicle part having a supporting structure and a case connected with said supporting structure, and a vibrator surrounded by the case which is formed to stimulate the case to oscillate whereby the oscillations are perceivable by a person. The vibrator for stimulating the oscillations of the case is coupled via at least one spring element differing from the case with the supporting structure of the vehicle part so that the oscillations of the case are stimulated via the supporting structure.

18 Claims, 5 Drawing Sheets

VIBRATORY ASSEMBLY FOR A VEHICLE

CROSS-REFERENCE TO RELATED PATENT APPLICATION

This application is a continuation of International Application PCT/EP2008/056152, filed May 20, 2008, which was published in German on Nov. 27, 2008, as WO 2008/142067A2. The foregoing International Application is incorporated herein by reference in its entirety.

BACKGROUND

The application relates to a vibrator assembly.

Such a vibrator assembly for a vehicle for stimulating an oscillation which is perceivable haptically and acoustically by a person comprises a vehicle part having a supporting structure with a case linked to the supporting structure as well as a vibrator enclosed by the case whereby the vibrator is coupled to the case in such a manner that the oscillations generated by the vibrator are detected by a person haptically (by touching the case). Such a vibrator assembly is known from DE 102 11 946 C1.

SUMMARY

An object of a disclosed embodiment is to provide a vibrator assembly of the mentioned kind as well as a process for stimulating an oscillation of a vehicle part whereby the adjustability of the oscillation properties is improved.

According to an exemplary embodiment it is intended that the vibrator for transferring the oscillations to the case via at least one additional spring element is connected with the supporting structure of the vehicle part.

Due to this active mounting of the vibrator via at least one separate spring element a multiple mass oscillator comprising the vibrator and the supporting structure coupled with the vibrator via the spring element is formed whereby the oscillation of this oscillating system is adjustable regarding their characteristic values (frequency and amplitude) by the selection of the coupling strength (spring constant) of the at least one spring element, the frequency and amplitude of the stimulated oscillation of the vibrator as well as by the interaction of the vibrator with the supporting structure at the time of the impact of the vibrator on to the supporting structure (passive mounting of the vibrator). The active mounting is specifically characterized in that a permanent coupling (changeable strength) between the vibrator and the supporting structure via at least one separate spring element exists.

The vibrator is exemplary constructed to oscillate between a first and a second position. Such an oscillation can occur along a defined direction in space, i.e. the vibrator is mounted directionally by the means of the at least one spring element. This direction runs preferably crosswise to a surface of the supporting structure against which the vibrator pushes periodically to stimulate an oscillation of the supporting structure.

The first and the second position each corresponding to a point of return of the oscillation of the vibrator do not have to be defined in space and can occur as a movement in space (non-directional active mounting).

In an exemplary alternative the vibrator is coupled to the supporting structure via the at least one spring element in such a manner that said vibrator rests against the supporting structure in a first position (for instance a point of return of the vibrator) and is arranged with a distance to the supporting structure in a second position (for instance another point of return of the vibrator). However, the vibrator can touch the supporting structure also in the second position or is arranged in a proximate manner to said supporting structure. The first position is primarily characterized in that the vibrator pushes against the supporting structure in said first position and transfers an impulse on to the supporting structure in order to stimulate said supporting structure to oscillate.

The vibrator is exemplary a device with an exciter element movably mounted in a housing enclosing the exciter element whereby the exciter element to stimulate an oscillation of the housing (vibrators) is coupled with the housing in such a manner that the movement of the exciter element generates an oscillation of the housing. The movement of the exciter element can comprise a rotation whereby the exciter element exhibits an unbalance or a linear (periodical) movement of the exciter element between two positions. The exciter element can be coupled to the housing via a spring means (active mounting) and/or can push directly against the housing in order to stimulate said housing to oscillate (passive mounting).

The case of the vehicle part rests preferably at least with one section against the housing in a form-closed manner so that oscillations of the housing are directly transferrable to the case.

The vibrator is exemplary coupled to the supporting structure via the housing using the at least one spring element. It is also possible that a multitude of spring elements are applied for the active mounting of the vibrator (housing). It is also possible that multiple vibrators are coupled to the supporting structure via one or multiple spring elements.

The vibrator has at least one contact area for transferring impulses to the supporting structure whereby the contact area is formed in such a manner that it pushes against the supporting structure during oscillation of the vibrator from the second into the first position whereby the at least one contact area protrudes from one side of the housing of the vibrator which faces the supporting structure into the direction of the supporting structure.

In an exemplary variant it is envisaged that the at least one contact area is tapered towards the supporting structure especially in a conically manner. In this connection the contact area can especially taper sharply so that the contact surface by which the contact area is in contact with the supporting structure is basically point-shaped. Through this the vibrator is able to pass forth into the supporting structure in a targeted manner (punctiform) and to stimulate corresponding oscillations of the supporting structure whereby the oscillations emanate from a stimulation centre. A deviating kind of stimulation of the supporting structure is effected if the contact area is designed comparatively larger and pitches on to the supporting structure in a laminar manner.

Furthermore, the contact surface can be tilted over compared to an outer surface of the supporting structure. Such tilted contact surface of contact areas of the housing are specifically able to influence the direction of the impulses to be transferred and thus to influence the propagation of the oscillation along the supporting structure.

Exemplary multiple contact areas distanced from each other are provided on the housing or the vibrator which are set up for and intended for pushing against the supporting structure during oscillating from the second into the first position in order to generate or influence an oscillating state of the supporting structure. Such a pushing action of the contact areas is carried out preferably in a synchronic manner. Thereby all contact areas can be formed in the same manner or differently (according to the above-presented implementation).

In an exemplary variant the case forms a touching area which is set up and intended for being touched by a person. The vibrator is thereby designed and coupled to the touching area of the case in such a manner that the oscillations generated by the vibrator are transferred to the touching area of the case and are perceivable there by a person touching the touching area.

In an exemplary embodiment the vehicle part is formed as a steering wheel whereby the supporting structure is formed as a steering wheel skeleton of the steering wheel and the case is formed as a steering wheel case enclosing the steering wheel skeleton.

The method according to an exemplary embodiment includes the following steps: stimulating the vibrator being coupled via the spring element to the supporting structure to an oscillation so that the oscillation of the vibrator stimulates the supporting structure via the at least one spring element to an oscillation, and monitor the oscillation of the vibrator in such a manner that a predetermined phase shift between the stimulated oscillation of the supporting structure and the stimulating oscillation of the vibrator is generated in order to set up the amplitude of the stimulated oscillation of the supporting structure (and therefore of the vehicle part).

In this connection especially the following steps can proceed:

The stimulating element (for instance unbalanced mass or a stimulating mass) mounted in the housing of the vibrator is initially arranged in a rest position so that no movement (oscillation) of the vibrator occurs.

The stimulating element is accelerated at the beginning for instance by moving a stimulating mass away from the supporting structure so that the stimulating element transfers its kinetic energy at least partly on to the surrounding housing, for instance by pushing against the housing and mainly in such a manner that the housing is moved away from the supporting structure due to the impulse transfer (a movement of the stimulating element is preferably effected electromotive).

Through this the kinetic energy of the stimulating element (housing) is transferred on to the active mounting of the vibrator, i.e. the spring element is stretched and exerts a force on to the supporting structure being coupled to the spring element in such a manner that the part of the supporting structure affixed to the spring element is accelerated into the direction of the housing of the vibrator, i.e. the impulse of the stimulator is transformed into the actual (to be generated) mechanical oscillation of the supporting structure. Emanating from the mounting point of the spring element at the supporting structure the oscillation propagates in the following on to the whole vehicle part.

Hereby the meaning of the active mounting, here in the form of the at least one spring element, lies in that by an appropriate selection of the spring constant the hub of the vibrator (housing), e.g. its maximum distance to the supporting structure, is adjustable as well as the phase shift between the oscillation of the stimulating element and the coupled system (pendular) comprising the spring element and the supporting structure connected to it.

Therefore a multi mass oscillator is generated by the active mounting of the vibrator in way of the at least one spring element, whereby the frequency and amplitude of the oscillation of said multi mass oscillator is manageable (adjustable) by stopping and stimulating the exciter element at appropriate time points which are definable according to known physical principals.

After the exciter element (unbalance or linear movable exciter mass) has experienced a maximal acceleration away from the supporting structure the movement of the exciter element reverses (alternatively exceeds into the same rotational direction in case of an unbalance) in such a manner that the exciter element moves into the direction of the supporting structure. In the meantime, a part of the energy is transferred via the at least one spring element (still tensed) on to the supporting structure.

This continuing movement of the supporting structure allows for the formation of a phase shift between the oscillation of the exciter mass and the supporting structure if the exciter element is driven accordingly, whereby the phase shift allows an increase of the amplitude of the oscillation of the supporting structure. Thereby the exciter element pushes by concomitant intermediate mounting of the housing on to the supporting structure at a time point when the supporting structure has completed its relative movement into the direction of the housing and therefore it can be moved by the exciter element into the opposite direction.

When the housing of the vibrator impacts the supporting structure via the passive mounting in way of the contact area the system can be influences anew.

By adjusting the active and passive mounting and by stimulating the exciter element phase shifts are producible allowing an increase of the amplitude of the resulting oscillation in a predetermined manner.

The combination of the aforementioned mounting modes is arbitrary as long as it occurs in a suitable adjustment. Both mounting modes can also be combined in one element (two-component part) so that the active mounting as well as the passive mounting can be formed or arranged at the same (spatial) position.

The passive mounting is adjustable by the kind, size and dimension of the surface which rests against the system to be stimulated. It is able to pass directed as well as "undirected", i.e. according to the direction diffuse impulses. By inserting different hardnesses of the materials at these points the impulse or oscillating properties and the noise development can be adjusted.

The active mounting is provided by the at least one spring element whereby the oscillating system is adjustable in respect to its characteristic parameters (frequency, amplitude, phase) via the spring constant (weight action force) of said spring element. The active mounting can also act into a specific direction, i.e. allowing an oscillating movement of the vibrator only along a determined direction.

The phase shift of the resulting oscillation of the supporting structure compared to the exciter oscillation can be adjusted by both mounting modes so that in each case defined amplitude increases of the resulting oscillation can be reached. Furthermore, the frequency and the amplitude of the resulting oscillation of the supporting structure (and therefore also of the case or of the whole vehicle part) can be adjusted by driving the exciter element (standstill of the exciter or the oscillation of the exciter with predetermined frequency and amplitude).

The adjustment of both mounting modes (active and passive) allows as a result the adjustment of the vibrator assembly for use as HMI (Human-Machine-Interface).

BRIEF DESCRIPTION OF THE DRAWINGS

Further details and advantages of the invention become apparent by the following description of examples with reference to the Figures.

DETAILED DESCRIPTION

Figure 1:
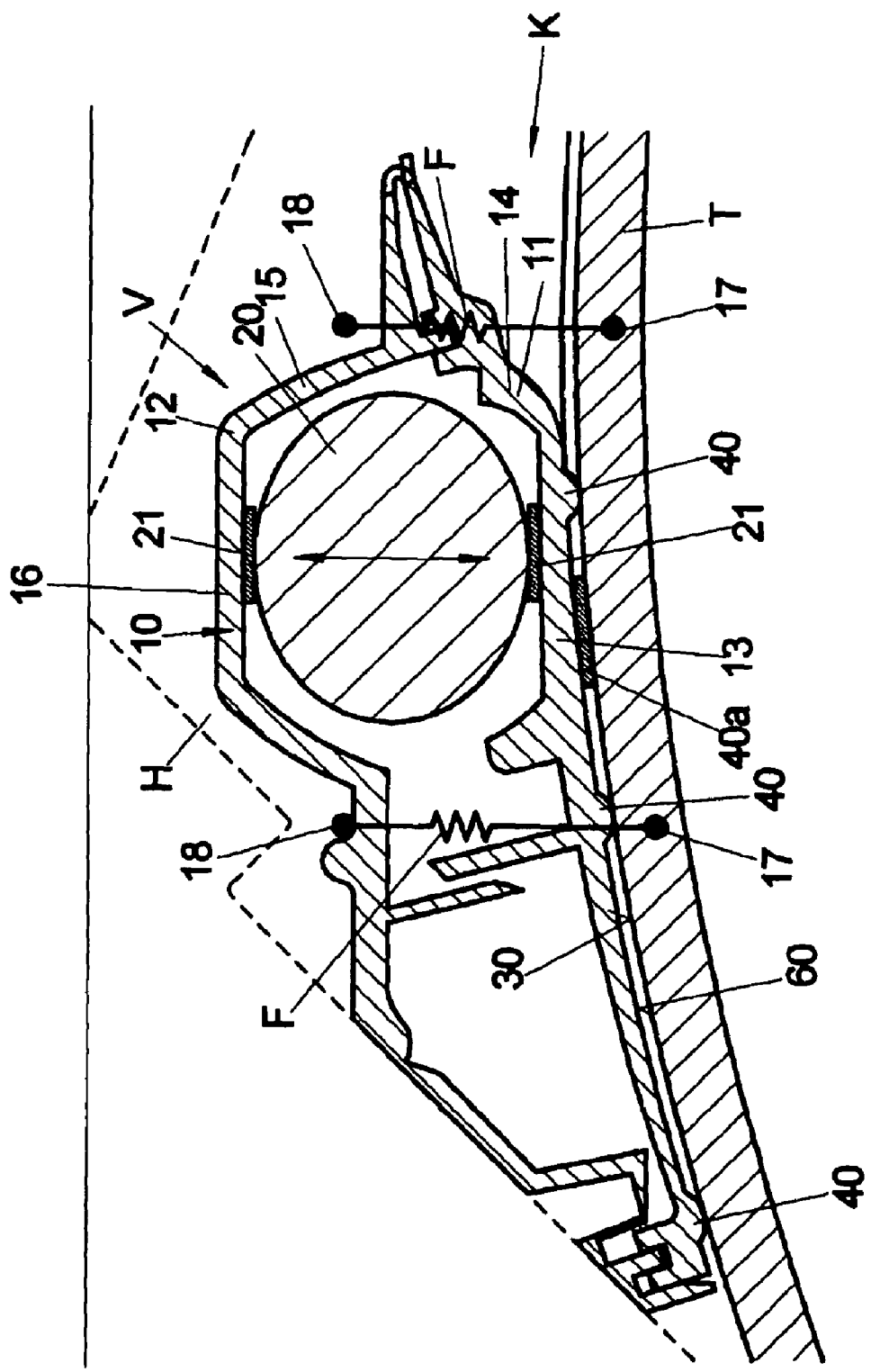
FIG. 1 shows a fragmentary sectional view of a vibrator assembly for a vehicle part with a vibrator coupled via two spring elements with the steering wheel rim skeleton of a steering wheel.
Figure 2:
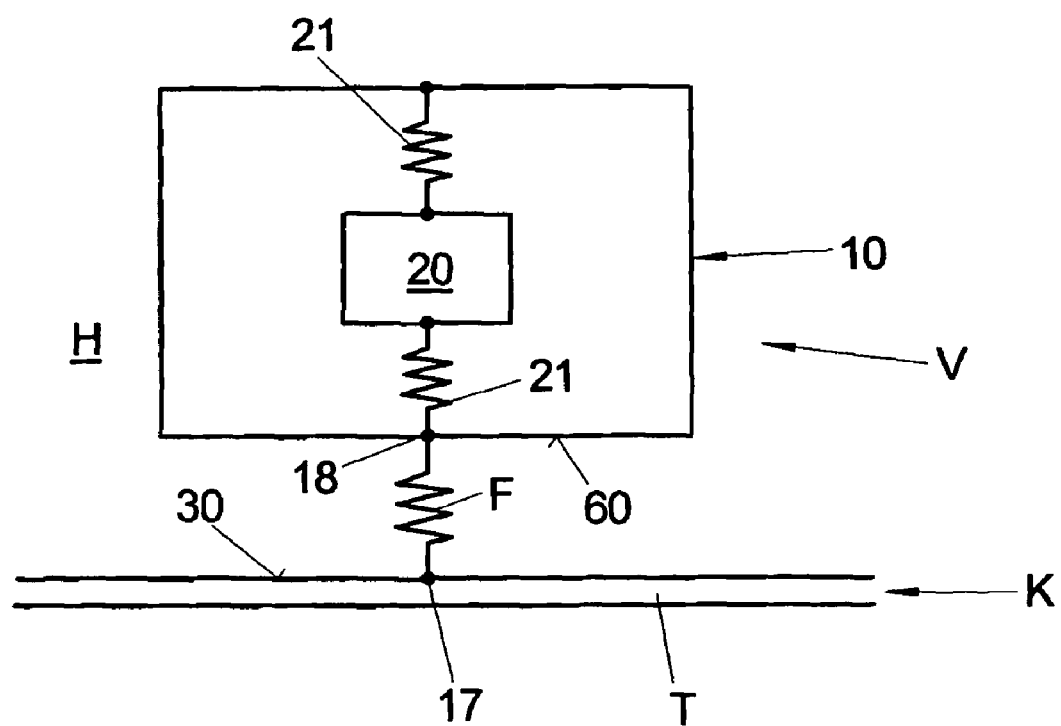
FIG. 2 shows a schematic illustration of a vibrator assembly of the kind shown in FIG. 1.
Figure 3:
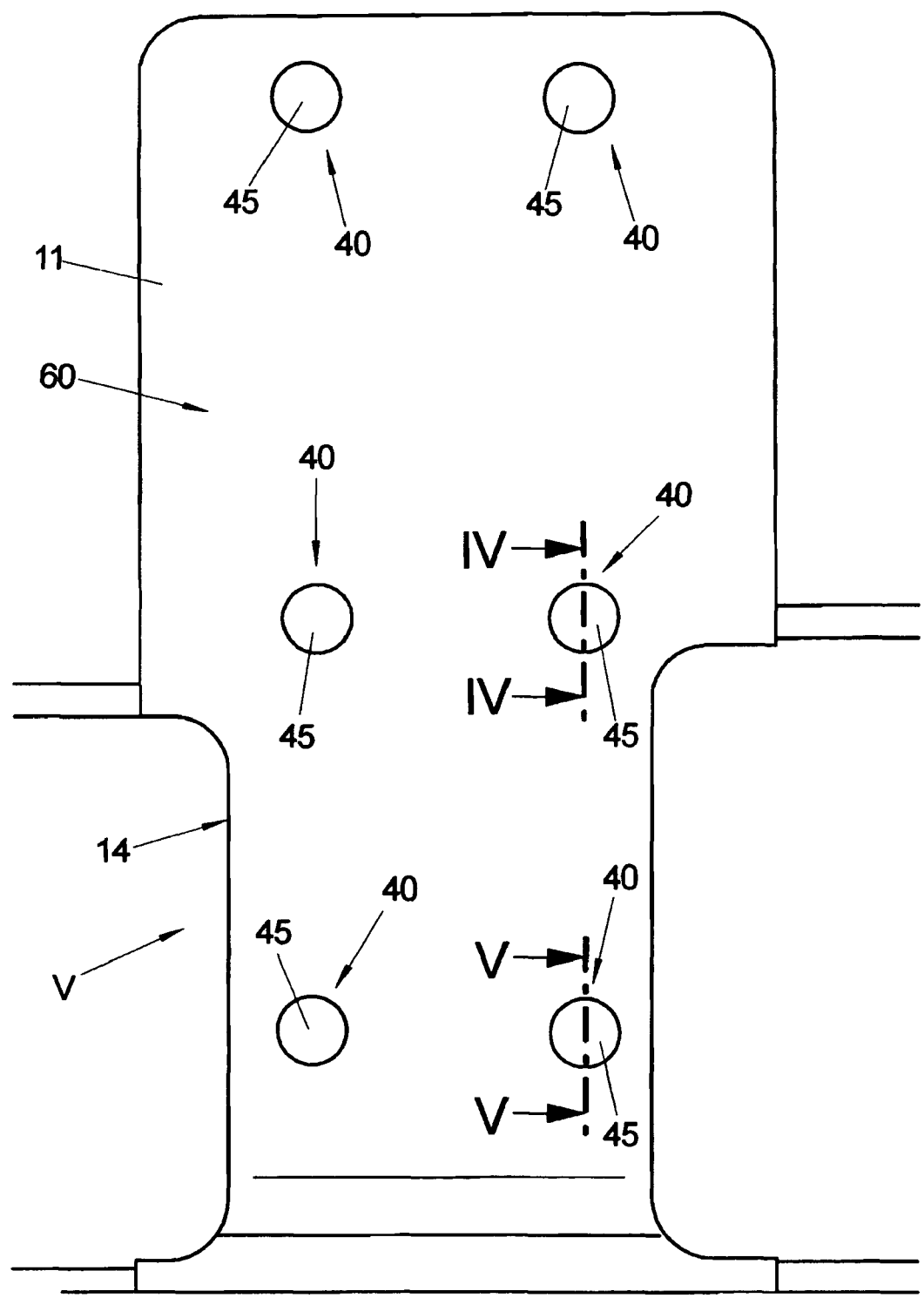
FIG. 3 shows a top view of a rear side of a vibrator facing the supporting structure of the kind as shown in FIG. 1.

FIG. 1 shows in combination with FIGS. 2 and 3 a vibrator assembly for a vehicle being configured to at least partially stimulate oscillations of a vehicle part in form of a steering wheel K so that these are perceivable by a driver. The vibrator assembly comprises a vibrator V composed of a housing 10 and an exciter element mounted in said housing whereby the exciter element is coupled to the housing 10 in such a manner that it can stimulate the housing 10 to oscillate whereby the frequency and amplitude characteristics can be predetermined in each case. In this manner any number of distinguishable haptic (acoustic) signals can be generated informing the driver while directing the vehicle. Such information comprises e.g. warnings of the driver in case of dangerous situations or operating conditions of components of vehicle equipment.

The housing 10 is preferably constructed in two parts and has a lower shell 11 arranged adjacent to supporting structure T and an upper shell 12 connected to the lower shell 11. From the bottom 13 of the lower shell 11 running along the supporting structure T a circumferential wall 14 of the lower shell 11 sticks out through which the lower shell 11 is connected with a circumferential wall 15 of the upper shell 12 of the housing 10 preferably using a clip connection whereby the circumferential wall 15 sticks out from a bottom 16 of the upper shell 12 into the direction of the lower shell 11.

The housing 10 is mounted to a supporting structure in the form of a steering wheel rim skeleton T via two spring elements F arranged in a distance to each other whereby the spring elements can be coil springs whereby the steering wheel rim skeleton forms a basic body for a steering wheel rim of the steering wheel. Each spring element F is affixed to the steering wheel rim T via a first free end section 17 and to the housing 10 via a second free end section 18 whereby the second free end section 18 is opposite to the first free end section 17 and is namely preferably affixed to the upper shell 12.

The housing 10 is oscillatory coupled to the steering wheel rim skeleton T via both spring elements F and namely in such a manner that the housing 10 while oscillating can transfer periodic impulses on to the steering wheel rim skeleton T, i.e. by pushing.

Thereby this active mounting of housing 10 provided by the spring elements F is preferably characterized in that by those active mounting no restrictions in respect to the (time-dependent) spatial position and the moving direction of housing 10 exist, i.e. the housing 10 can likewise oscillate in all spatial directions. As a basic principle a coupling between the housing 10 and the supporting structure T exists via the spring elements F whereby the respective momentary coupling strength depends on the position of housing 10 in relation to the supporting structure T, i.e. on the tension of the spring elements F.

The oscillation (exciter oscillation) of the vibrator V is generated by an exciter element 20 in form of an exciter mass movably mounted between the bottoms 13, 16 of both shells 11, 12 in such a manner that the exciter mass 20 can transfer impulses on to the housing 10 for stimulating housing 10. This can be a permanent active mounting, e.g. via spring means 21 connecting the exciter mass 20 with the housing 10 or a passive mounting, i.e. the exciter mass 20 can rest against the housing 10 and thereby transfer impulses on to the housing 10 whereby the amount and direction of the impulses are influenced by the formation of the areas of the housing 10 and the exciter element 20 when getting in contact while pushing in regard of form and material properties (elasticity). In case of a passive mounting a coupling (interaction) between exciter mass 20 and housing 10 (or between housing 10 and supporting structure T) only takes place if the involved elements transfer impulses through clashing.

The oscillations of housing 10 are transferred on the one hand to the supporting structure T through active coupling F and on the other hand through pushing the housing 10 against the supporting structure T. Especially the exciter mass 20 can be driven in such a manner that a phase shift between the oscillation of the exciter mass 20 and the stimulated oscillation of the supporting structure T is generated. By this the amplitude of the forced oscillation of the supporting structure T can be increased (especially at a phase shift of $\pi/2$).

Furthermore, the phase shift between the oscillation of the exciter element 20 and the oscillation of the supporting structure T is also influenced by the passive mounting of the housing 10 in respect to the supporting structure T, i.e. by the interaction between supporting structure T and housing 10 if these periodically clash against each other during oscillation of housing 10. This interaction can be adjusted on the one hand by the material selection of the areas of the supporting structure T and the housing 10 hitting each other (e.g. by elastic, if applicable permanent contact areas 40a between housing 10 and supporting structure T) and on the other hand by the geometrical shape of the areas hitting each other. According to the embodiment shown in FIG. 1 the steering wheel rim skeleton T has a smooth surface 30 facing the housing 10 against which contact areas 40 of the housing bounce during oscillation of housing 10, whereby the contact areas stick out alongside a direction running across to surface 30 of housing 10 into the direction of that surface 30, namely from bottom 13 of the lower shell 11. Preferably six of such contact areas 40 distanced to each other protrude from said shell 13. Each of the contact areas 40 have a contact surface 45 facing surface 30 of the supporting structure T whereby the contact areas 40 are in contact with the supporting structure T via the contact area 45.

Figure 5A:
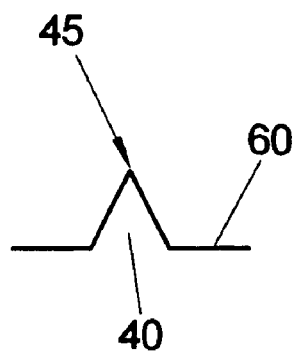
FIG. 5A shows a schematic sectional view along the line V-V of FIG. 3.
Figure 5B:
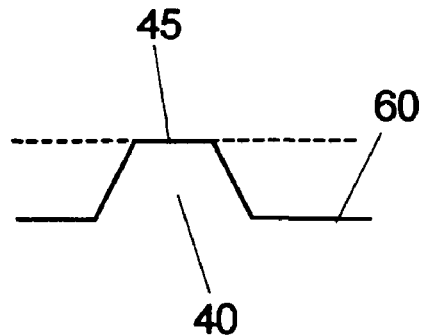
FIG. 5B shows a schematic sectional view along the line V-V of FIG. 3.

Thereby, the contact areas can taper conically according to FIGS. 5A and 5B whereby the contact surfaces 45 can especially be point-shaped or in comparison to the surface of bottom 13 on the lower shell 11 have a significant or by orders of magnitude smaller surface.

Figure 4A:
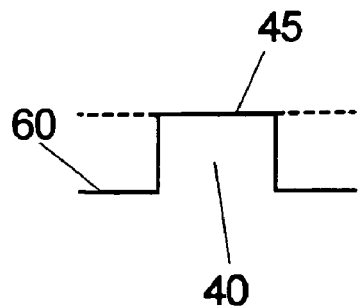
FIG. 4A shows a schematic sectional view along the line IV-IV of FIG. 3.

In a further embodiment the surface areas 40 are formed cylindrically according to FIG. 4A and have in each case a contact surface 45 which is adjusted parallel to the surface 30 underneath.

Figure 4B:
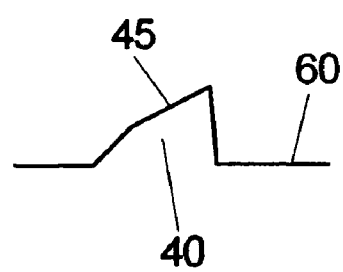
FIG. 4B shows a schematic sectional view along the line IV-IV of FIG. 3.
Figure 4C:
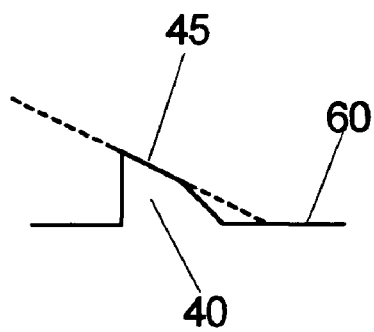
FIG. 4C shows a schematic sectional view along the line IV-IV of FIG. 3.

According to FIGS. 4B and 4C the contact surfaces 45 can also run tilted over compared to surface 30. Such a form of the contact areas 45 is especially suited to exert an influence on the direction of the impulse (stimulating the oscillation) to be transferred.

The above described contact areas 40 and respectively contact surfaces 45 can also be arbitrarily combined with each other for influencing the transfer of the oscillation between exciter element 20 (housing 10) and supporting structure T.

Emanating from the supporting structure T the oscillation enforced by the vibrator V can propagate over the whole vehicle part K whereby the case H is of course also directly stimulated by the vibrator V since it preferably encloses housing 10 tightly. Thereby the steering wheel case H encloses the steering wheel rim skeleton T in cross section and can for instance be foamed on to the steering wheel rim skeleton T. Oscillations transferred on to the steering wheel case H are haptically perceivable by a driver especially on the outer surface of the steering wheel case H forming a touching area, for instance by touching the touching area with a hand.

The oscillations of the vehicle part K caused by the vibrator V can of course also be acoustically perceivable, i.e. the vehicle part K and respectively parts of it being able to oscillate in this case act as a sound converter.

Figure 6:
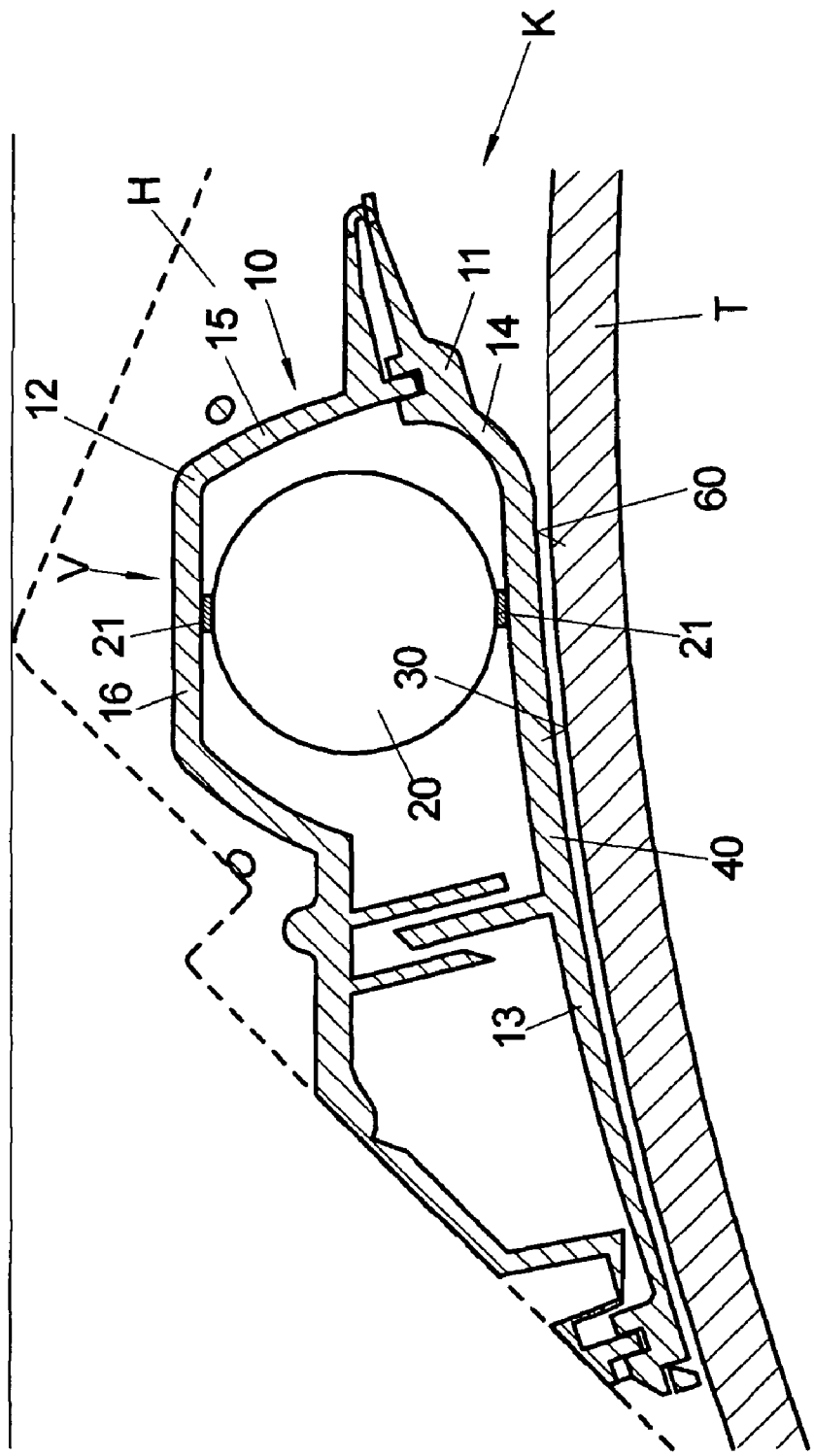
FIG. 6 shows a sectional view of a modified vibrator assembly as shown in FIG. 1.

FIG. 6 shows a modification of the embodiment shown in FIG. 1 in which unlike to FIG. 1 the contact area 40 of the housing 10 is formed by the whole rear side 60 of bottom 13 of housing 10 facing the complete surface 30 of the supporting structure T. Furthermore, the housing 10 of FIG. 6 is mounted only passively on the supporting structure T via said rear side 60.

The priority application, German Patent Application 10 2007 024 140.4, filed May 23, 2007 including the specification, drawings, claims and abstract, is incorporated herein by reference in its entirety.

What is claimed is:

1. A vibrator assembly for a vehicle for generating an oscillation of a vehicle part detectable by a person with
    a vehicle part having a supporting structure and a case connected with said supporting structure, and
    a vibrator surrounded by the case which is formed to stimulate the case to oscillate whereby the oscillations are perceivable by a person,
    wherein the vibrator for stimulating the oscillations of the case is coupled via at least one spring element differing from the case with the supporting structure of the vehicle part so that the oscillations of the case are stimulated via the supporting structure;
    wherein the vibrator is formed for oscillating between a first and a second position, and wherein the vibrator is coupled via the at least one spring element with the supporting structure in such a manner that said vibrator rests against the supporting structure in a first position and is arranged with a distance to the supporting structure in a second position.

2. The vibrator assembly according to claim 1, wherein the spring constant of the at least one spring element is determined in dependency of the oscillation of the vibrator in such a manner that a predetermined phase shift between the oscillation of the vibrator and the oscillation of the supporting structure stimulated by the vibrator is generated.

3. The vibrator assembly according to claim 1, wherein the vibrator has a housing.

4. The vibrator assembly according to claim 3, wherein the vibrator has an exciter element movably mounted in the housing.

5. The vibrator assembly according to claim 4, wherein the exciter element for generating an oscillation of the housing is coupled to the housing in such a manner that the movement of the exciter element generates an oscillation of the housing.

6. The vibrator assembly according to claim 4, wherein the exciter element is coupled to the housing via spring means.

7. The vibrator assembly according to claim 3, wherein the case rests at least with one section against the housing in a form-closed manner.

8. The vibrator assembly according to claim 3, wherein the vibrator is coupled via the housing using the at least one spring element to the supporting structure.

9. The vibrator assembly according to claim 1, wherein the vibrator has at least one contact area which is set for and intended for pushing against the supporting structure during oscillation of the vibrator from the second into the first position in order to activate or influence an oscillating status of supporting structure.

10. The vibrator assembly according to claim 9, wherein the at least one contact area in dependency of the oscillation of the vibrator is formed elastically in such a manner that a predetermined phase shift between the oscillation of the vibrator and the oscillation of the supporting structure caused by the vibrator is generated.

11. The vibrator assembly according to claim 9, wherein the at least one contact area has a contact surface facing the supporting structure with which the contact area pushes against the supporting structure.

12. The vibrator assembly according to claim 9, wherein multiple contact areas distanced from each other are provided which are set up for and intended for pushing against the supporting structure during oscillating from the second into the first position in order to generate or influence an oscillating state of the supporting structure.

13. The vibrator assembly according to claim 1, wherein the vibrator is coupled with the case in such a manner that oscillations generated by the vibrator stimulates oscillations of the case which a person is able to perceive acoustically or haptically.

14. The vibrator assembly according to claim 1, wherein the vehicle part is formed as a steering wheel.

15. The vibrator assembly according to claim 14, wherein the supporting structure is formed as a steering wheel skeleton of the steering wheel.

16. The vibrator assembly according to claim 15, wherein the case is formed as a steering wheel case enclosing the steering wheel skeleton.

17. The vibrator assembly according to claim 1, wherein a multitude of vibrators enclosed by the case are provided, whereby each of those vibrators are formed to stimulate the case to oscillate, these oscillations being perceivable by a person, and whereby the individual vibrators are coupled in each case via at least one additional spring element to the supporting structure of the vehicle part for stimulating the oscillations of the case.

18. A method for generating an oscillation of a vehicle part by using a vibrator assembly according to claim 1 with the following steps:
    stimulating the vibrator being coupled via the spring element to the supporting structure to an oscillation so that the oscillation of the vibrator is transferred via the at least one spring element to the supporting structure, and
drive the vibrator in such a manner that a phase shift between the oscillation of the vibrator and the oscillation of the supporting structure for influencing the amplitude of the oscillation of the supporting structure is generated.

* * * * *